July 13, 1971
G. N. EDWARDS
3,592,887
METHOD OF INJECTION MOLDING OF PLASTIC
COATING ON HOLLOW METAL BODY
Filed Feb. 19, 1969
2 Sheets-Sheet 1
FIG. 1
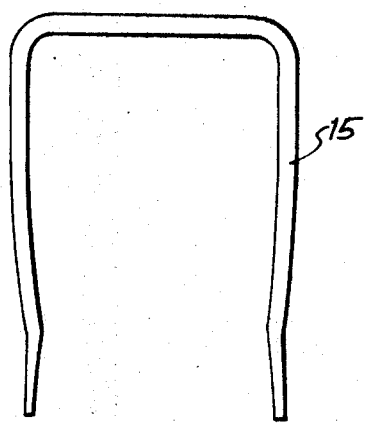
FIG. 3
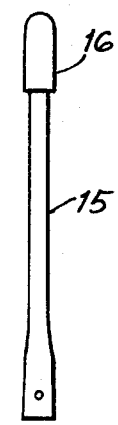
FIG. 2
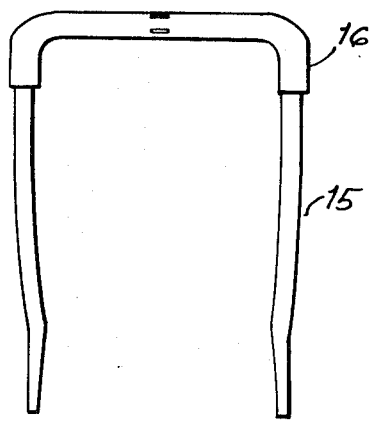
FIG. 4
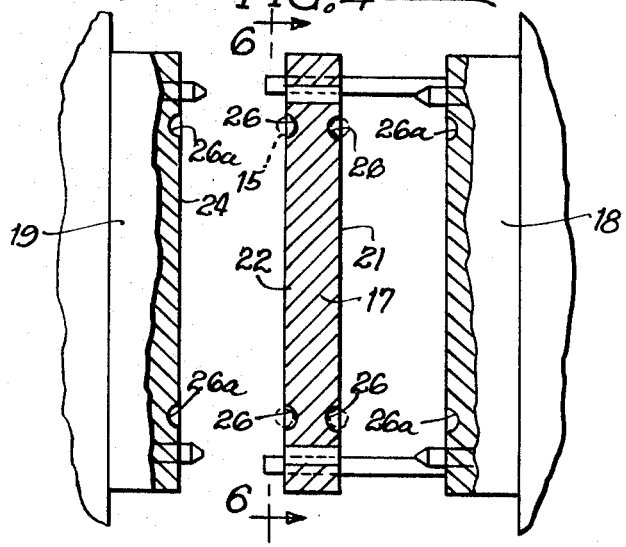
FIG. 5
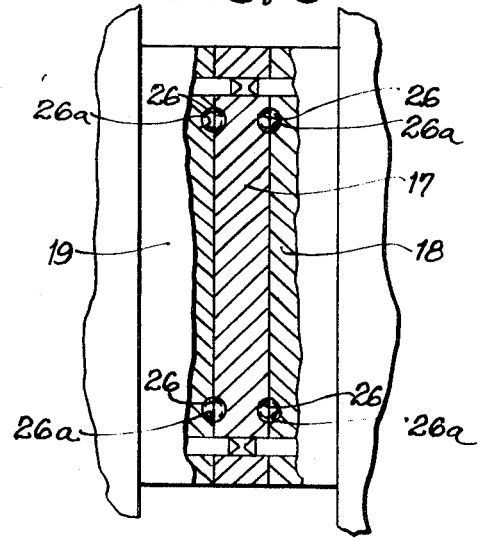
FIG. 6
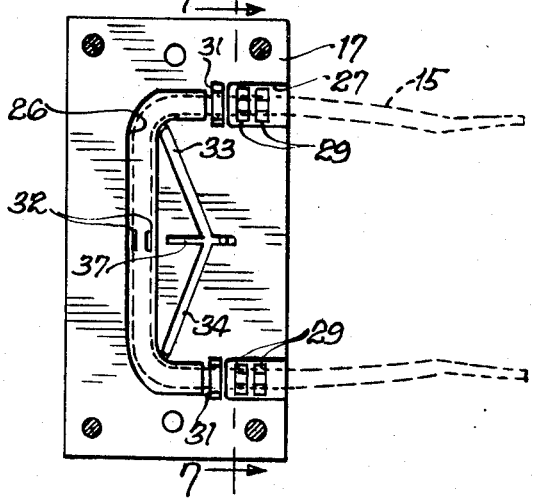
FIG. 7
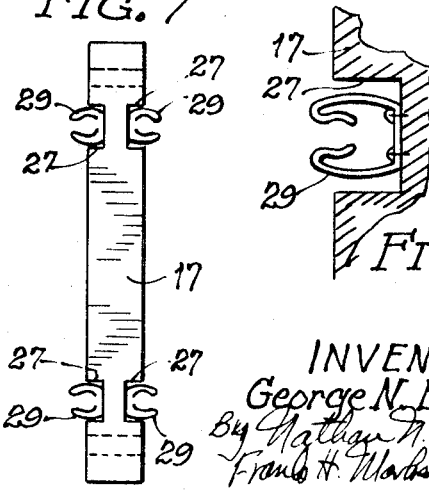
FIG. 7a
INVENTOR
George N. Edwards
By Nathan N. Kraus
Frank H. Marks
Attys

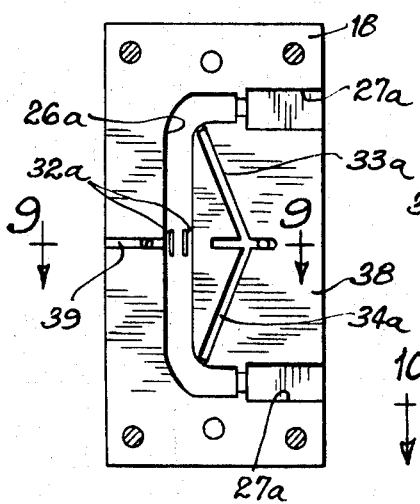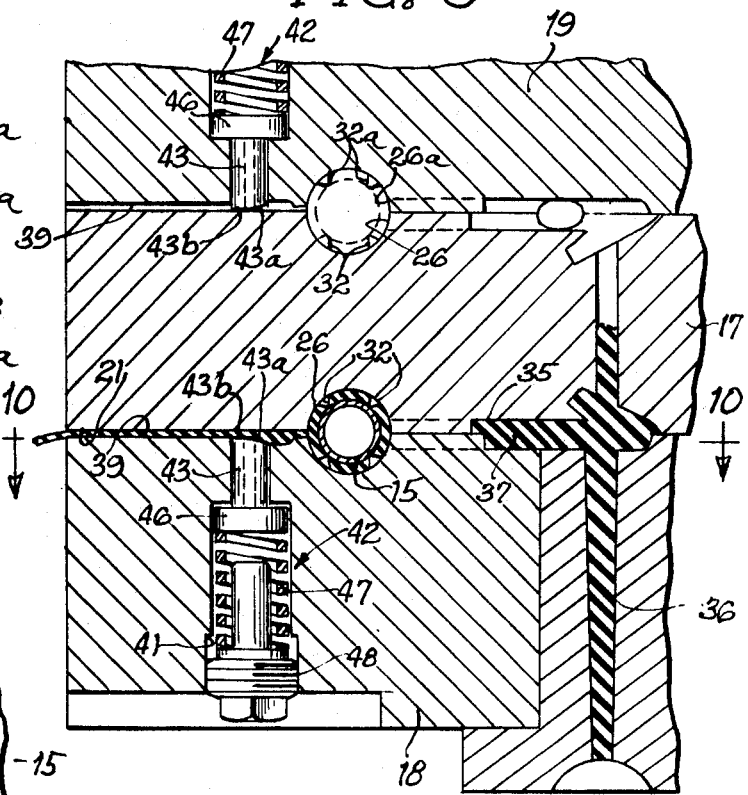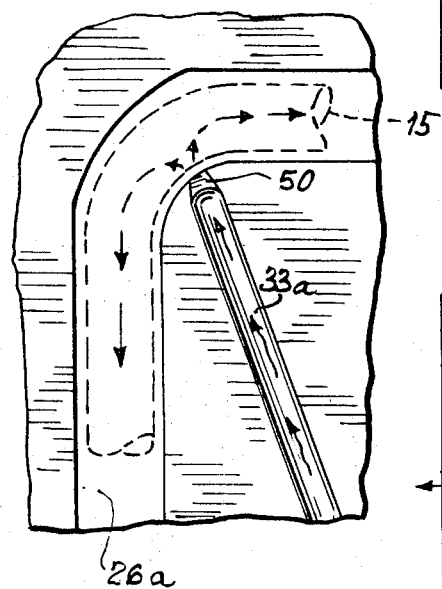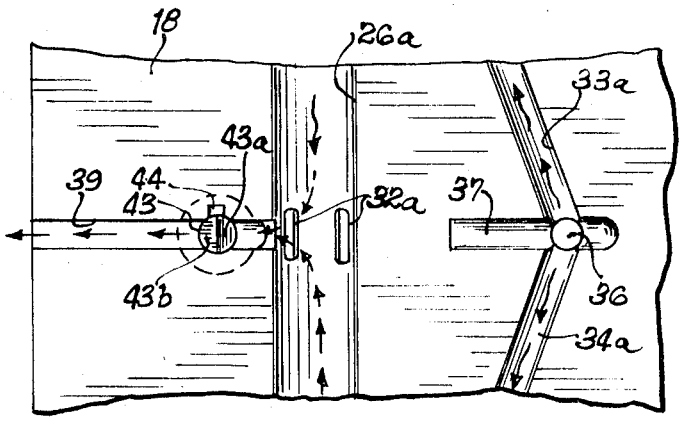

United States Patent Office 3,592,887
Patented July 13, 1971

1

3,592,887
METHOD OF INJECTION MOLDING OF PLASTIC COATING ON HOLLOW METAL BODY
George N. Edwards, Newark, Ohio, assignor to Roper Corporation, Kankakee, Ill.
Filed Feb. 19, 1969, Ser. No. 800,534
Int. Cl. B29f 1/06, 1/10
U.S. Cl. 264—161                           4 Claims

ABSTRACT OF THE DISCLOSURE

A method for coating a hollow body with plastic material by injection molding to prevent collapse of the hollow body in the molding operation. The pressure in the die cavity is relieved by the automatic opening of a valve disposed in the die plate to vent the die cavity to the atmosphere when pressure in the die cavity exceeds a predetermined value. Nibs are provided in the die cavity to support the body and prevent permanent deformation of the body in the molding cycle.

BACKGROUND OF THE INVENTION

The present invention relates to the application of a coating or sleeve of plastic material on a hollow metal body by injection molding.

Plastic coatings or sleeves have been applied to the hand gripping portions of tubular metal handles used on pushtype apparatus, such as lawn mowers, snow-blowers and the like. Such sleeves or coatings are utilized to avoid contact of the operator's hands with the bare metal of the handle and also for ornamental purposes. Heretofore, such sleeves in oversized tubular form have been drawn or telescoped over the tubular handles and then caused to be shrunk or contracted in situ. Of necessity, such sleeves have been in the form of smooth sections of plastic tubing without any decorative embellishment or variations in the thickness or surface characteristics which would improve the aesthetics of the handle and also the gripping qualities of the portions of the handle engaged by the hands of the operator. Insofar as I am aware, any attempts made to apply sleeve-type coatings to metal tubular sections by injection molding, generally, have been unsuccessful because of the tendency of the tubular sections to collapse at one or more points when subjected to the high pressures required in an injection molding operation, such pressures being of the order of 1,000 p.s.i.

SUMMARY OF THE INVENTION

It is an object of the present invention to provide a method for applying a coating or sleeve of plastic material to a hollow metal body by injection molding in such a manner that collapse or deformation of the body is completely avoided.

Another object of the present invention is the provision of a method for applying on a tubular metal section a plastic coating having improved aesthetic and functional characteristics.

These and other objects and advantages of the present invention are attained by the provision of adjustable valve means associated with the cooperating die plates for venting excess pressure from the die cavities in an injection molding cycle and the use of nibs in the die cavities to prevent deformation.

2

BRIEF DESCRIPTION OF THE DRAWINGS

FIG. 1 is a front elevational view of a tubular metal handle showing the same before the application of a plastic coating thereto.

FIG. 2 is a similar view showing a plastic sleeve applied to the handle.

FIG 3 is an end elevational view of the handle and sleeve illustrated in FIG. 2.

FIG. 4 is a fragmentary vertical cross-sectional view of cooperating die plates employed in carrying out my invention and showing the same in open position.

FIG. 5 is a similar view showing the die plates in closed position.

FIG. 6 is an elevational view taken substantially on line 6—6 of FIG. 4 and showing in broken lines the bight portion of the handle disposed within the die cavity.

FIG. 7 is a cross-sectional view taken substantially on line 7—7 of FIG. 6.

FIG. 7a is a fragmentary cross-sectional view of a detail.

FIG. 8 is a view similar to FIG. 6 but showing a complementary die plate and the handle removed from the die cavity.

FIG. 9 is a fragmentary cross-sectional view, on an enlarged scale, taken substantially on line 9—9 of FIG. 8 and showing the valve means of my invention associated with the die plates, the same being in closed position with the tubular handle disposed within the die cavities.

FIG. 10 is a cross-sectional view taken substantially on line 10—10 of FIG. 9 and FIG. 11 is a fragmentary elevational view of the die plate illustrated in FIG. 8.

DESCRIPTION OF THE PREFERRED EMBODIMENT

Referring to the draiwngs, the numeral 15 indicates a U-shaped handle formed of tubular metal and of the type conventionally employed on push-type apparatus, such as lawn mowers and snowblowers. FIGS. 2 and 3 illustrate the finished product, namely, a tubular handle on which has been applied a plastic coating or sleeve 16 by injection molding, in accordance with my invention.

The injection molding machine utilized in carrying out my invention is a conventional type utilizing a common center moveable die plate 17 in combination with stationary and moveable die plates 18 and 19 respectively. It will be seen by reference to FIGS. 4 and 5 that opposed faces 21 and 22 of the center die plate 17 are complementary respectively to confronting faces 23 and 24 of the die plates 18 and 19. This arrangement permits simultaneous operation on two handles in one cycle and it will be understood that with adequate press opening a greater number may be processed.

Referring to FIGS. 6 and 7, the die plate 17 is provided in each of its faces 21 and 22 with a generally U-shaped die cavity 26, the leg portions of which open into respective recesses 27 provided in the plate. Anchored in each of said recesses is a pair of spaced spring clips 29 which are arranged to securely hold a handle 15 in proper registration within a cavity. Additionally, two pairs of guide lugs 31 are fixed to each of the faces 21 and 22 in registration with respective spring clips 29 and serve as additional means for accurately locating the tubular handle 15 within the die cavity 26. Each die cavity also includes a pair of spaced lugs or nibs 32 which serve to position the tubular handle within the die cavity to insure the application of a uniform concentric thickness of plastic material circumposed about the handle. The nibs 32 also afford support for the handle to prevent permanent deformation of the same due to the high injection pressure. Accordingly, the placement of the nibs is judiciously selected to support the handle at points where maximum deflection is likely to occur, and it will be understood that a die cavity may be provided with plurality of pairs of nibs, depending upon the character of the article being coated.

Each of the faces 21 and 22 of the die plate 17 is provided with a pair of inlet gates 33 and 34 providing conduits between the sprue 36, hereinafter to be described, and the die cavity 26 at points coinciding with the inner radius of each of the elbows of the bight portion of the handle. In accordance with standard injection molding practice a gate extension 37 is provided for forming a sprue puller 35.

FIG. 8 illustrates the face 38 of a complemental die plate which may be either the moveable plate 18 or the stationary plate 19. Said plate face includes a die cavity 26a provided with positioning lugs or nibs 32a and each leg of the cavity communicates with a recess 27a in which is accommodated the spring clips 29 and guide lugs 31 when confronting plate faces 21 and 23 and 22 and 24 are in contiguous relation, as when the die plates are in closed position. The plate face 38 is provided with inlet gates 33a and 34a which are adapted to register with the inlet gates 33 and 34 respectively, of the confronting plate faces 21 and 22. Said inlet gates 33a and 34a communicate with a sprue 36 through which the molding material is injected by conventional means well known in the art.

The inlet and outlet gates at their respective junctures with the die cavities 26, 26a are materially reduced in cross-sectional area, as at 50 (FIG. 11), so that when the completed unit is removed from the molding apparatus the size of the sprue portion adjacent the molded sleeve will be minimal in size. Accordingly the sprue may be separated from the molded sleeve with minimal disfigurement of the sleeve or coating.

Referring to FIGS. 8 and 9, each of the faces of the end die plates 18 and 19 is provided with an outlet gate 39 which communicates with the die cavity 26a substantially centrally thereof. Said outlet gate extends to the edge of the die plate 18 or 19 and is vented to the atmosphere. Each of the die plates 18 and 19 is provided with a stepped bore 41 in which is received an adjustable valve assembly 42. Said assembly includes a valve stem 43 provided with an integral key 44 received in a cooperating key-way in the reduced portion of the bore 41 and an integral enlarged head 46 received in an enlarged portion of said bore. Thus, the valve stem 43 is precluded from rotation but is axially movable. The top circular end of the stem 43 is beveled as at 43a so as to provide a semi-circular surface 43b which is adapted to engage the face of the confronting die plate, as will be hereinafter explained. A coiled compression spring 47 is contained within the enlarged portion of the bore 41 and at one end bears against the head 46 of the valve stem. An adjusting screw 48 abuts against the opposite end of the spring 47 and functions to adjust the spring pressure. The valve stem 43 is disposed in registration with the outlet gate 39 and the topmost semi-circular surface 43b of the stem 43 will abut the face 21 or 22 to effectively seal off the flow of any plastic material from the die cavity.

When the pressure acting on the bevelled face 43a of the valve stem 43 exceeds the pressure generated by the spring 47, the valve stem 43 will be caused to move away from contact with the die face 21 or 22 permitting the fluid plastic material within the die cavity to flow through the outlet gate 39 thereby relieving the pressure within the die cavity. As soon as the injection pressure is cut off at the end of an injection cycle, spring 47 is again effective to urge the valve stem 43 to closed position to seal off the flow of fluid plastic in the outlet gate 39 and actually to sever the sprue within the outlet gate.

It will be understood that my invention contemplates the use of any suitable plastic resinous material which is capable of being used in an injection molding apparatus. Such materials may include vinyls, polyethylenes, polypropylenes and the like. It will also be understood that my invention is not intended to be limited to the coating only of tubular objects but contemplates coating of hollow bodies of any desired form by injection molding.

In operation, a tubular handle 15 is placed within each die cavity 26 of the center die plate 17, in the manner hereinbefore described, so that it is accurately located to be received within the corresponding complementary cavity 26a of the end die plates 18 and 19 when said plates are caused to be moved to closed position. The operational cycle of the injection molding apparatus then is initiated resulting in a closing of the die plates 17, 18 and 19 and the injection of fluid plastic material into the sprue 36 from which it flows through the inlet gates 33, 33a 34 and 34a into the die cavity 26, 26a. The plastic material is injected into the sprue 36 at a pressure of approximately 1,000 p.s.i. and at such pressure collapse of a portion of the tubular handle within the die cavity previously had been experienced. However, in accordance with my invention, after the die cavity has been completely filled, the valve stem 43 which has been adjusted to operate at a predetermined pressure will yield to permit the passage of plastic material into the outlet gate 39 to relieve the pressure within the die cavity, thereby to avoid the build up of excessive pressure within the die cavity such as would cause collapse of any portion of the tube. When the injection pressure is cut off the spring pressure on the valve stem 43 will urge the stem to closed position thus, cutting off any further flow of plastic material through the outlet gate and severing the sprue in the outlet gate.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. The method of applying a plastic covering material onto a hollow body by injection molding at high pressure without deformation of said hollow body, which comprises
  (a) positioning the hollow body within a die cavity communicating with passages provided with inlet and outlet gates,
  (b) injecting the plastic material into the die cavity through the inlet gate at high pressure, to fill the die cavity and to effectively apply the covering to the hollow body, and
  (c) relieving the pressure of the injected material within the die cavity by commencing the flow of material through the passage adjacent to the outlet gate at a time prior to the incidence of forces of sufficiently great extent to cause deformation of said hollow body.

2. The method set forth in claim 1, wherein the step of positioning the hollow body within the die cavity is effected equidistantly from the walls of the latter to produce an integral covering of substantially uniform thickness.

3. The method set forth in claim 1, wherein the step of positioning the hollow body within the die cavity is effected equidistantly from the walls of the latter through the intermediary of discontinuous spacing nibs disposed at least at the point of potential maximum deformation in proximity to the outlet gate.

4. The method set forth in claim 1, including the step of severing the sprue formed in the passage at the outlet gate at the point of pressure relief.

References Cited

UNITED STATES PATENTS

| | | | |
|---|---|---|---|
| 2,197,465 | 4/1940 | Brunetti | 264—275X |
| 2,577,005 | 12/1951 | DiGiacomo | 264—272 |
| 2,668,325 | 2/1954 | Goodwin | 18—30(CR) |
| 2,697,854 | 12/1954 | Boasson et al. | 264—40X |
| 2,892,214 | 6/1959 | McCarthy | 18—30 |
| 3,014,242 | 12/1961 | Baker et al. | 18—30(CR) |
| 3,236,491 | 2/1966 | Keinänen | 264—275X |
| 3,259,680 | 7/1966 | Schelke | 264—275 |
| 3,350,487 | 10/1967 | Hofer et al. | 264—161 |
| 3,443,001 | 5/1969 | Adair et al. | 264—161 |

ROBERT F. WHITE, Primary Examiner

A. M. SOKAL, Assistant Examiner

U.S. Cl. X.R.

264—275, 328; 18—30, 36